United States Patent
Meermeier

(10) Patent No.: US 7,809,566 B2
(45) Date of Patent: Oct. 5, 2010

(54) ONE-STEP REPAIR OF MISRECOGNIZED RECOGNITION STRINGS

(75) Inventor: Ralf Meermeier, Somerville, MA (US)

(73) Assignee: Nuance Communications, Inc., Burlington, MA (US)

( * ) Notice: Subject to any disclaimer, the term of this patent is extended or adjusted under 35 U.S.C. 154(b) by 990 days.

(21) Appl. No.: 11/549,362

(22) Filed: Oct. 13, 2006

(65) Prior Publication Data

US 2007/0213979 A1    Sep. 13, 2007

Related U.S. Application Data

(60) Provisional application No. 60/726,797, filed on Oct. 14, 2005.

(51) Int. Cl.
*G10L 15/28* (2006.01)

(52) U.S. Cl. ............... 704/255; 704/243; 704/240; 704/257; 704/234

(58) Field of Classification Search ................. 704/251, 704/255, 243, 231, 254, 240, 234, 257
See application file for complete search history.

(56) References Cited

U.S. PATENT DOCUMENTS

| | | | | |
|---|---|---|---|---|
| 5,555,344 A | * | 9/1996 | Zunkler | 704/242 |
| 5,677,990 A | * | 10/1997 | Junqua | 704/255 |
| 5,855,000 A | | 12/1998 | Waibel et al. | 704/235 |
| 6,078,887 A | | 6/2000 | Gamm et al. | 704/275 |
| 6,374,220 B1 | * | 4/2002 | Kao | 704/255 |
| 6,571,210 B2 | * | 5/2003 | Hon et al. | 704/251 |
| 7,315,818 B2 | | 1/2008 | Stevens et al. | 704/235 |
| 2003/0018475 A1 | * | 1/2003 | Basu et al. | 704/270 |
| 2004/0024601 A1 | | 2/2004 | Gopinath et al. | 704/270 |
| 2008/0114595 A1 | * | 5/2008 | Vair et al. | 704/236 |
| 2010/0004931 A1 | * | 1/2010 | Ma et al. | 704/244 |

FOREIGN PATENT DOCUMENTS

EP    1376999 A1    1/2004

\* cited by examiner

*Primary Examiner*—Vijay B Chawan
(74) *Attorney, Agent, or Firm*—Sunstein Kann Murphy & Timbers LLP

(57) ABSTRACT

A method for use in automatic speech recognition corrects erroneous recognition elements within a recognition hypothesis. A user input is recognized as a correction hypothesis which contains various recognition elements. A non-deterministic alignment is performed to align at least a portion of the correction hypothesis with an earlier recognition hypothesis which also contains various recognition elements such that the recognition elements in the aligned portion of the correction hypothesis are determined to most likely, correspond to a range of recognition elements in the earlier recognition hypotheses. The recognition elements in the range of recognition elements in the earlier recognition hypothesis are replaced with the recognition elements in the aligned portion of the correction hypothesis.

12 Claims, 2 Drawing Sheets

| | | | | | $M_{p1}$ | | $M_{p2}$ | | | | |
|---|---|---|---|---|---|---|---|---|---|---|---|
| prev_rec | 6 | 1 | 7 | 4 | 3 | 8 | 4 | 4 | 4 | 4 |
| hypo | | | | 4 | 2 | 8 | | | | |
| | | | | | $M_{h1}$ | | $M_{h2}$ | | | | |

(A)

| fixed_prev_rec | 6 | 1 | 7 | 4 | 2 | 8 | 4 | 4 | 4 | 4 |
|---|---|---|---|---|---|---|---|---|---|---|

(B)

|  |  |  |  | $M_{p1}$ |  | $M_{p2}$ |  |  |  |  |
|---|---|---|---|---|---|---|---|---|---|---|
| prev_rec | 6 | 1 | 7 | 4 | 3 | 8 |  |  |  |  |
| hypo |  |  |  | 4 | 2 | 8 | 4 | 4 | 4 | 4 |
|  |  |  |  | $M_{h1}$ |  | $M_{h2}$ |  |  |  |  |

(A)

| fixed_prev_rec | 6 | 1 | 7 | 4 | 2 | 8 | 4 | 4 | 4 | 4 |
|---|---|---|---|---|---|---|---|---|---|---|

ONE-STEP REPAIR OF MISRECOGNIZED RECOGNITION STRINGS

This application claims priority from U.S. Provisional Application 60/726,797, filed Oct. 14, 2005, the contents of which are incorporated herein by reference.

FIELD OF THE INVENTION

The invention generally relates to automatic speech recognition, and more specifically to repairing improperly recognized strings of recognition elements.

BACKGROUND ART

It is understood that speech recognition systems will make errors, which can take many forms. One type of common misrecognition error is illustrated by a simple dialogue:
Caller: 617-428-4444.
System: 617-438-4444, correct?
In this exchange, the system mistook the digit "2" for a "3."
Considerable effort is taken to develop correction mechanisms which should be as effective and efficient as possible.

SUMMARY OF THE INVENTION

Embodiments of the present invention include systems and methods for use in automatic speech recognition which correct erroneous recognition elements within a recognition hypothesis. A user input is recognized as a correction hypothesis which contains various recognition elements. A non-deterministic alignment is performed to align at least a portion of the correction hypothesis with an earlier recognition hypothesis which also contains various recognition elements such that the recognition elements in the aligned portion of the correction hypothesis are determined to most likely correspond to a range of recognition elements in the earlier recognition hypothesis. The recognition elements in the range of recognition elements in the earlier recognition hypothesis are replaced with the recognition elements in the aligned portion of the correction hypothesis.

In a further embodiment, the non-deterministic alignment may favor alignments corresponding to recognition elements in the earlier recognition hypothesis that have a higher probability of being misrecognized. The non-deterministic alignment may use a Viterbi-based search.

The recognition elements may be organized into arrays such that the non-deterministic alignment is based on an alignment of the array elements, where each recognition element may be a separate array entry. The non-deterministic alignment may include using splicing markers to establish the boundaries of the aligned portion of the correction hypothesis, or the range of recognition elements in the earlier recognition hypothesis, or both.

In various embodiments, the earlier recognition hypothesis may be an intermediate recognition hypothesis in a recognition process such as an entry on N-Best list of recognition hypotheses. The recognition elements may be, for example, digits or alphanumeric characters.

Embodiments of the present invention also include a speech recognition system adapted to use a method according to any of the above.

BRIEF DESCRIPTION OF THE DRAWINGS

FIG. 2 shows an alignment array for misrecognition repair according to one embodiment of the present invention.

DETAILED DESCRIPTION OF SPECIFIC EMBODIMENTS

Figure 1:
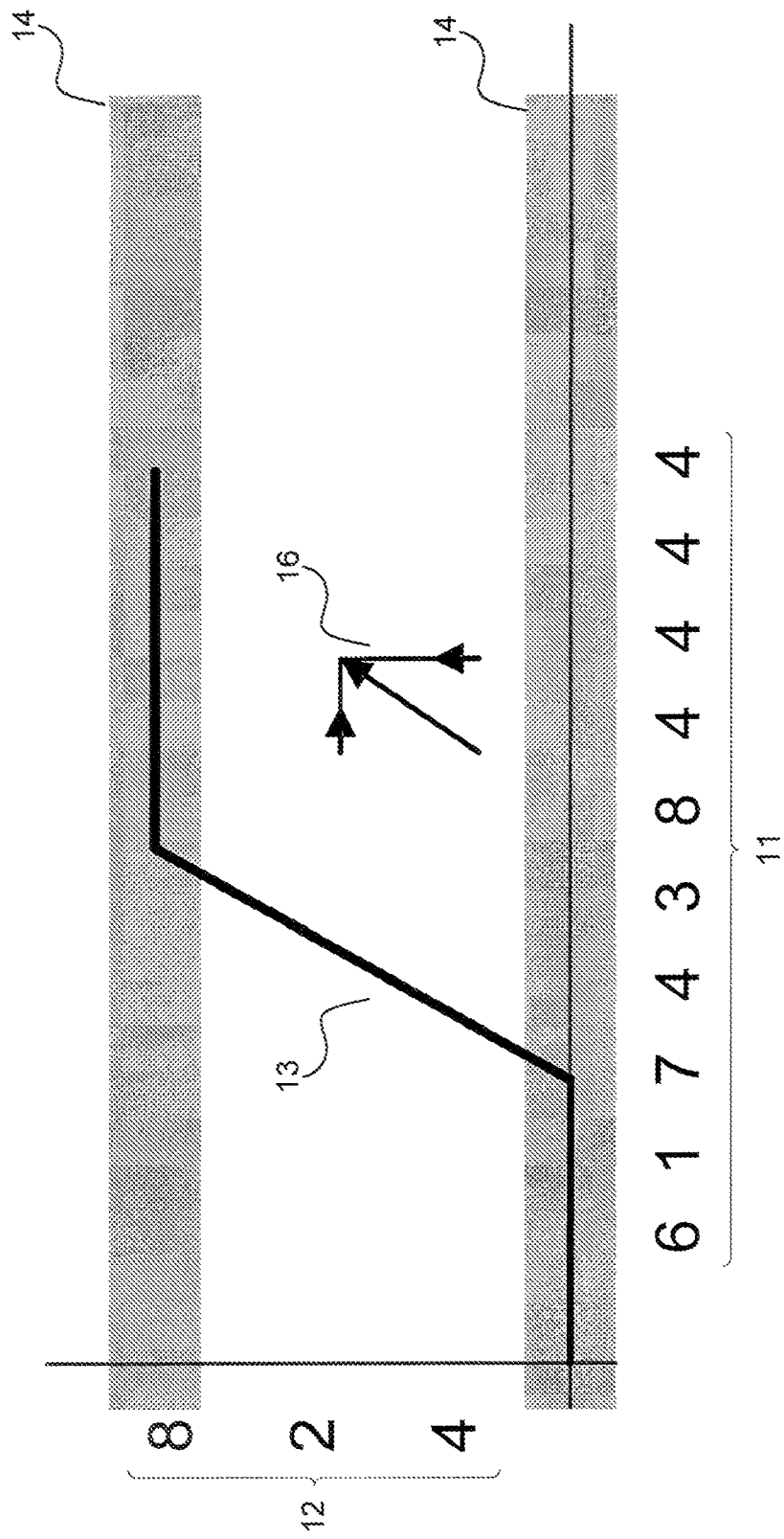
FIG. 1 shows use of a Viterbi grid alignment according to one embodiment of the present invention.

Embodiments of the present invention are directed to techniques for use in automatic speech recognition which correct erroneous recognition elements within a recognition hypothesis. For example, this may take the form of a general-purpose algorithm for one step repairing of misrecognized digits and character strings.

Embodiments use an algorithm that can deal with the following scenario:
Caller: 617-428-4444
System 617-438-4444, correct? (<–mistook the "2" for a "3")
Caller: No, 428!

The algorithm in this case would correctly combine the two caller utterances to infer the correct recognition string (617-428-4444). It does so by choosing the most likely repair, most likely repairs being ones that correspond to the smallest misrecognition error (based on a probabilistic quality criterion). The algorithm itself does not require any particular constraints on the length or structure of the caller's response, thus allowing for much more natural response handling by the system (e.g. in the above scenario, also "No, 28", "No, 742" and other responses would all result in a successful correction to 617-448-4444).

Thus, embodiments offer improved total recognition accuracy because available information from the first recognition is intelligently utilized. This is unlike prior art "skip list" approaches (also known as "don't make the same mistake twice"), which simply block the previous misrecognition string in the second recognition. In addition, explicit prompting of the caller for full information may not be needed. Because embodiments can deal with substrings as well as with a full string repetition, the caller can decide how to repair a misrecognition. The probabilistic nature of specific embodiments also ties naturally into a speech recognizer which is itself probabilistic-based. This is another differentiator from the prior art which attempted to deal with the problem of one-step correction using a deterministic approach.

A user input is recognized as a correction hypothesis which contains various recognition elements. A non-deterministic alignment is performed to align at least a portion of the correction hypothesis with an earlier recognition hypothesis which also contains various recognition elements such that the recognition elements in the aligned portion of the correction hypothesis are determined to most likely correspond to a range of recognition elements in the earlier recognition hypothesis. The recognition elements in the range of recognition elements in the earlier recognition hypothesis are replaced with the recognition elements in the aligned portion of the correction hypothesis.

The non-deterministic alignment may favor alignments corresponding to recognition elements in the earlier recognition hypothesis that have a higher probability of being misrecognized. The non-deterministic alignment may use a Viterbi-based search. The recognition elements also may be organized into arrays such that the non-deterministic alignment is based on an alignment of the array elements, where each recognition element may be a separate array entry. The non-deterministic alignment may include using splicing markers to establish the boundaries of the aligned portion of the correction hypothesis, or the range of recognition elements in the earlier recognition hypothesis, or both.

FIG. 1 shows one specific embodiment which uses a Viterbi algorithm with certain extensions to get the most likely alignment between two strings. A previously recognized array 11, prev_rec[ ], contains recognition elements from the misrecognized utterance e.g., [6,1,7,4,3,8,4,4,4,4]. A correction utterance hypothesis 12, (hypo[ ], e.g., vertical array of elements [4,2,8] in FIG. 1) is returned from the recognizer for the correction utterance by retrieval from the N-Best list returned at the end of the recognition (which could be implemented by the application layer), or from a hypothesis that occurs during recognition (e.g., more low-level hypothesis). These variables are used as inputs to an algorithm according to a specific embodiment of the invention. As shown in FIG. 1, the caller may be allowed (and expected) to say only a substring, so initial and trailing deletions in prev_rec should have zero penalty 14. And the algorithm may not allow backward transitions, so that the grid path 16 can only move diagonal, rightwards and upwards.

The correction algorithm may initially split up the return values of both the previously recognized array 11, prev_rec[ ] and the correction utterance hypothesis 12, hypo[ ] so that each element is a separate entry in an array (e.g. 428->[4,2,8]). Then, as shown in FIG. 1, a Viterbi alignment is run on the two arrays (prev_rec and hypo) to get the most likely alignment 13 between the digits. From that, an alignment array 20 may be formed as shown in FIG. 2A. The content of the section Mp1-Mp2 in the previously recognized array 11, prev_rec[ ], is replaced with the content of Mh1-Mh2 in the correction utterance hypothesis 12, and hypo[ ], the result is placed into a new fixed array 21, fixed_prev_rec, as shown in FIG. 2B. At the end of algorithm, the value of the fixed array 21, fixed_prev_rec, can be passed on as the return value (which now has the correct sequence in it), along with any applicable bias. For example, a biasing mechanism may be used which is proportional to the total number of errors. However, the biasing probably should be limited, for example, to take into account the case where noise recognition creates a high number of errors.

The path transition penalties that guide the Viterbi grid into the most likely alignment are important. Those penalties can be chosen by hand, but a higher repair accuracy may be achieved by drawing in additional information. For example, a confusion matrix, confusion_matrix[ ], of confusion probabilities may be used to describe the probabilities of confusing one character with another. This data call be extracted for example by running offline tests, created by hand or generated through other means like phonetic similarity of items. The confusion matrix may also contain an "empty element" row and column, which then describes the probability of deletions/insertions. The confusion matrix can be used to apply penalties for the path transitions to guide the Viterbi search by favoring paths that correspond to easily misrecognized characters. Since many Viterbi implementations operate in the log probability domain, the penalty could correspond to the logarithm of the confusion probability (with optional probability, flooring mechanisms to still allow unseen confusions).

In addition or alternatively, word confidences can be taken into account with a variable such as prev_rec_confidences[ ]. Many recognizers offer confidence values of the different elements in the recognition string, which correspond to the recognizer's confidence to have correctly recognized the specific element. The values for the prev_rec recognition, transformed suitably into a penalty, can additionally be used to guide the most likely path through the Viterbi grid. A low confidence value of an element in prev_rec should result in a small penalty (since this element was very likely misrecognized and should thus be replaced).

To further expedite available information, it may be useful to distinguish between two different cases depending on the nature of the to-be-recognized string:

Variable string length recognition (e.g. email address): All three types of recognition errors may be allowed (substitutions/deletions/insertions). The three allowed path transitions (up, right, diagonal) may be considered for the path, and the penalties may be applied by looking up the log probability/probability of transition in the confusion matrix and adding/multiplying it to the path score.

Fixed length recognition (e.g. 10-digit telephone number): Since confusions are the by far most likely errors in this scenario (deletions are only allowed if they come along with an insertion), deactivating the rightward and upward transitions by assigning a very high penalty to them will most likely increase repair accuracy.

Specific embodiments may use an algorithm which may not make any particular assumptions regarding the number of errors committed in the prev_rec recognition, and in fact, may be capable of detecting and repairing multiple errors. It may be more of a design consideration as to whether multi-errors should be suppressed (e.g. by asking the caller to split up the total string so that the majority of misrecognitions will be single-error), or invited (e.g., by letting the caller speak the whole string at once, and then deal with potential partial repairs).

In various embodiments, the earlier recognition hypothesis may be an intermediate recognition hypothesis in a recognition process or an entry on N-Best list of recognition hypotheses. The design choices for specific such embodiments may involve a tradeoff between CPU load and recognition accuracy. For example, one embodiment may be written in ECMAscript and operate on the internal hypotheses of the recognizer to have the benefit of increasing accuracy by disallowing hypotheses during recognition.

Embodiments of the present invention are not confined to just digits recognition, and embodiments can be capable of repairing any multi-element recognition string, and can thus be employed in many scenarios, including digits recognition (e.g., telephone number, SSN), and alphanumeric recognition (e.g., email addresses, spelled names), Embodiments of the invention may be implemented in any conventional computer programming language. For example, preferred embodiment may be implemented in a procedural programming language (e.g. "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other, memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for use in automatic speech recognition comprising:
    recognizing a user input as a correction hypothesis containing a plurality of recognition elements;
    performing a non-deterministic alignment of at least a portion of the correction hypothesis with an earlier recognition hypothesis containing a plurality of recognition elements such that the recognition elements in the aligned portion of the correction hypothesis are determined to most likely correspond to a range of recognition elements in the earlier recognition hypothesis;
    replacing the elements in the range of recognition elements in the earlier recognition hypothesis with the recognition elements in the aligned portion of the correction hypothesis.

2. A method according to claim 1, wherein the non-deterministic alignment favors alignments corresponding to recognition elements in the earlier recognition hypothesis that have a higher probability of being misrecognized.

3. A method according to claim 1, wherein the non-deterministic alignment uses a Viterbi-based search.

4. A method according to claim 1, wherein the recognition elements are organized into arrays such that the non-deterministic alignment is based on an alignment of the array elements.

5. A method according to claim 4, wherein each recognition element is a separate array entry.

6. A method according to claim 4, wherein the non-deterministic alignment includes using splicing markers to establish the boundaries of the aligned portion of the correction hypothesis.

7. A method according to claim 4, wherein the non-deterministic alignment includes using splicing markers to establish boundaries of the range of recognition elements in the earlier recognition hypothesis.

8. A method according to claim 1, wherein the earlier recognition hypothesis is an intermediate recognition hypothesis in a recognition process.

9. A method according to claim 1, wherein the earlier recognition hypothesis is an entry on N-Best list of recognition hypotheses.

10. A method according to claim 1, wherein the recognition elements are digits.

11. A method according to claim 1, wherein the recognition elements are alphanumeric characters.

12. A speech recognition system adapted to use the method according to any of claims 1-11.

* * * * *